US012347634B2

(12) United States Patent
Rognard et al.

(10) Patent No.: US 12,347,634 B2
(45) Date of Patent: Jul. 1, 2025

(54) CIRCUIT BREAKER COMPRISING AN IMPROVED GAS FLOW MANAGEMENT

(71) Applicant: General Electric Technology GmbH, Baden (CH)

(72) Inventors: Quentin Dominique Louis Rognard, Villeurbanne (FR); David Berard, Villeurbanne (FR); Cyril Gregoire, Villeurbanne (FR); Jérôme Laurent, Villeurbanne (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 157 days.

(21) Appl. No.: 18/248,956

(22) PCT Filed: Oct. 12, 2021

(86) PCT No.: PCT/EP2021/078173

§ 371 (c)(1),
(2) Date: Apr. 13, 2023

(87) PCT Pub. No.: WO2022/079026

PCT Pub. Date: Apr. 21, 2022

(65) Prior Publication Data

US 2023/0386771 A1 Nov. 30, 2023

(30) Foreign Application Priority Data

Oct. 15, 2020 (EP) .................................... 20202116

(51) Int. Cl.
*H01H 33/70* (2006.01)
*H01H 33/74* (2006.01)

(52) U.S. Cl.
CPC ........ *H01H 33/7023* (2013.01); *H01H 33/74* (2013.01)

(58) Field of Classification Search
CPC ........... H01H 33/7023; H01H 33/7038; H01H 33/7046; H01H 33/7053; H01H 33/7084;
(Continued)

(56) References Cited

U.S. PATENT DOCUMENTS 3,975,602 A * 8/1976 Hertz .................. H01H 33/901 218/66
6,207,917 B1 * 3/2001 Lehmann ............... H01H 33/88 218/51

(Continued)

FOREIGN PATENT DOCUMENTS

CA 1115312 A 12/1981
DE 3211272 A1 4/1983

(Continued)

OTHER PUBLICATIONS

International Search Report and Written Opinion in PCT/EP2021/078173 dated Jan. 27, 2022 (12 pages).

(Continued)

*Primary Examiner* — William A Bolton
(74) *Attorney, Agent, or Firm* — Eversheds-Sutherland (US) LLP

(57) ABSTRACT

A high-voltage circuit breaker. The high voltage circuit breaker filled with insulating gas having a main axis A, including arcing contacts and an insulating nozzle, wherein an insulating gas flowing from a storage chamber and heated by an electric arc between the two arcing contacts is partitioned into a first gas flow and a second gas flow conducted outside of the insulating nozzle from opposite directions toward a main gas chamber, wherein the first gas flow flows through a first intermediary gas chamber and the second gas flow flows through a second intermediary gas chamber and is partitioned in a first portion directed to the main gas chamber and a second portion directed to an exhaust gas chamber, characterized in that the first portion of the second
(Continued)

gas flow is smaller than the second portion of the second gas flow.

11 Claims, 5 Drawing Sheets

(58) Field of Classification Search
CPC ........ H01H 33/74; H01H 33/78; H01H 33/90; H01H 33/901; H01H 33/91; H01H 2033/902
USPC ........ 218/43, 46, 48, 51, 53, 57, 63, 68, 72, 218/81, 80, 79
See application file for complete search history.

(56) References Cited

U.S. PATENT DOCUMENTS

| | | | | |
|---|---|---|---|---|
| 9,029,726 | B2 * | 5/2015 | Cernat | H01H 33/91 218/43 |
| 9,524,836 | B2 * | 12/2016 | Ozil | H01H 33/901 |
| 9,899,167 | B2 * | 2/2018 | Florez | H01H 33/7015 |
| 2005/0173378 | A1 * | 8/2005 | Nowakowski | H01H 33/91 218/43 |
| 2017/0352509 | A1 * | 12/2017 | Biquez | H01H 9/32 |
| 2018/0012715 | A1 | 1/2018 | Pierres et al. | |

FOREIGN PATENT DOCUMENTS

| | | | |
|---|---|---|---|
| EP | 0075668 | A2 | 4/1983 |
| EP | 1105898 | A1 | 6/2001 |
| EP | 1226597 | A1 | 7/2002 |
| EP | 1502271 | A1 | 2/2005 |
| EP | 2056322 | A1 | 5/2009 |

OTHER PUBLICATIONS

Extended European Search Report issued in EP Application No. 20202116.8 dated Mar. 12, 2021, 6 pages.

* cited by examiner

CIRCUIT BREAKER COMPRISING AN IMPROVED GAS FLOW MANAGEMENT

TECHNICAL FIELD

The invention concerns a high voltage gas circuit breaker comprising an improved gas flow management, particularly suited for circuit breakers having reduced dimensions.

PRIOR ART

Some high voltage gas circuit breaker, known as live tank circuit breakers, use self-blast technology to efficiently blast an electric arc formed when opening the circuit breaker.

A gas flow management is intended to increase the efficiency of the self-blast.

Document EP-2.056.322 discloses a circuit breaker comprising a flow derivation device at the end of the exhausts so that the two insulating gas flows coming from the two exhausts have an equal effect on the insulating gas present in the permanent contact area.

When the two gas flows collide, the gas pressure increases in an area surrounding the main contacts.

In a context of cost reduction for a circuit breaker, it has been proposed to reduce the dimensions of the device.

Such a solution imposes to master lots of parameters like the pressures in the circuit breaker.

Because of the counter-balancing discussed before, the pressure in the insulating chamber in general & in fixed side exhausts especially is increased at a too high value, preventing hot gases to escape from arcing contacts area, resulting in general lack of breaking performance The object of the invention is to provide a circuit breaker comprising means ensuring that the movable contact remains steady in an opened position of the circuit breaker.

BRIEF DESCRIPTION OF THE INVENTION

The invention concerns a high-voltage circuit breaker filled with insulating gas having a main axis A, comprising:

- two arcing contacts facing axially each other and radially surrounded by an insulating nozzle;
- two main contacts facing axially each other and arranged radially outside of the insulating nozzle, each of the main contacts being assigned to one of the arcing contacts,
- wherein an insulating gas flowing from a storage chamber and heated by an electric arc in a region between the two arcing contacts is partitioned into a first gas flow and a second gas flow of opposite directions,
- wherein the first gas flow and second gas flow are conducted outside of the insulating nozzle from opposite directions at least partially toward a main gas chamber surrounding the main contacts,
- wherein the first gas flow flows toward the main gas chamber through a first intermediary gas chamber and the second gas flow flows toward the main gas chamber through a second intermediary gas chamber,
- wherein it the second gas flow flowing in the second intermediary gas chamber is partitioned in a first portion directed to the main gas chamber and a second portion directed to an exhaust gas chamber,
- characterized in that the first portion of the second gas flow is smaller than the second portion of the second gas flow.

Preferably, the second intermediary gas chamber is in fluidic communication with the main gas chamber via at least one first opening and is in fluidic communication with the exhaust gas chamber via at least one second opening and the overall section of the at least first opening is inferior to the overall section of the at least second opening.

Preferably, the first gas flow exits the first intermediary gas chamber through openings, and the ratio between the total section of the openings and the total section of the first openings is comprised between 0% and 10% and the ratio between the total section of the first openings and the total section of the second opening is comprised between 0% and 20%.

Preferably, the second intermediary gas chamber is axially bounded by a radial wall located axially on the contacts side, and the second gas flow presses axially on said radial wall towards the arcing contacts.

Preferably, the surface of the radial wall is designed so that a force resulting from the pressure of the second gas flow on this wall balances a force resulting from the pressure of the first gas flow on a movable part of the circuit breaker.

Preferably, the radial wall is movable in the circuit breaker together with the nozzle and the nozzle comprises a radial face on which the first gas flow presses axially towards the arcing contacts, and the surface of the radial wall is designed so that said force resulting from the pressure of the second gas flow on the radial wall balances a force resulting from the pressure of the first gas flow on the radial face of the nozzle.

Preferably, the radial wall is stationary in the circuit breaker and comprises apertures closed off by discharge valves and that said force resulting from the pressure of the second gas flow on the radial wall prevents the discharge valves from opening until a certain gas pressure is attained.

Preferably, the high-voltage circuit breaker further comprises calibrated conduits located between the second intermediary gas chamber and the exhaust gas chamber.

Preferably, the main gas chamber is of annular shape and surrounds the other chambers and components of the circuit breaker and an axial end of the main gas chamber, located on the second intermediary gas chamber side, is designed to provoke the first gas flow to flow back axially towards the first intermediary chamber.

Preferably, an annular wall separating the main gas chamber and the second intermediary gas chamber comprises a conical portion which allows a reduction of the section of the main chamber when getting away from main contacts.

Preferably, the first openings are formed in the conical portion.

Preferably, at least one end portion of an outer wall surrounding the main gas chamber comprises an inner face of reduced diameter with respect to a central portion of the outer wall.

DETAILED DESCRIPTION OF PARTICULAR EMBODIMENTS

Figure 1:
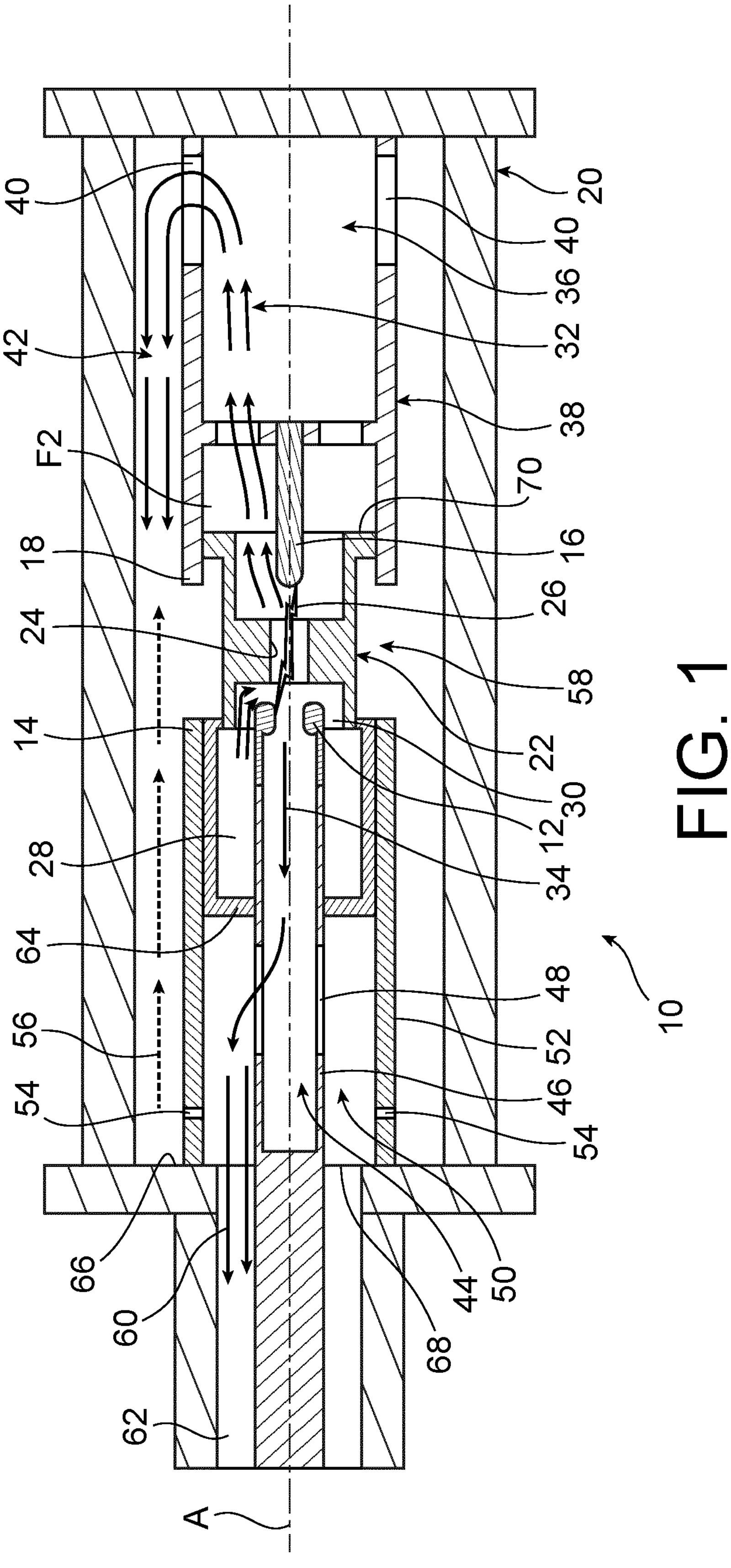
FIG. 1 is a schematic diagram of an axial section of a circuit breaker according to a first embodiment of the invention.

FIG. 1 illustrates an essentially rotation symmetrical example embodiment of a high-voltage circuit breaker 10 with a longitudinal main axis A. A tulip-shaped arcing contact 12 with associated first main contact 14 and a pin-shaped arcing contact 16 with associated second main contact 18 are installed on the inside of an insulating casing 20 that is filled with an insulating gas.

The casing 20 is made for example of porcelain or a composite material.

As non-limiting examples, the insulating gas is selected from the following list: SF6, CO2, a mixture of CO2 and O2, a mixture comprising Fluoronitrile, CO2 and O), a mixture of Fluoronitrile and N2, a mixture comprising a Fluoroketone, CO2 and O2, of a mixture of a Fluoroketone with N2.

The main contacts 14, 18 are arranged in radial direction outside of the arcing contacts 12, 16.

The associated contacts 12, 14 and 16, 18, respectively are arranged coaxially to each other and can be displaced jointly, relative to each other, in the direction of the longitudinal axis A, meaning from a closed, and thus switched-on, end position to an opened, and thus switched-off, end position, and back again.

In the closed position, the arcing contacts 12, 16 are in contact with each other and the first and second main contacts 14, 18 are in contact with each other, so that electrical current can flow via the contacts. In the opened position, the arcing contacts 12, 16 are separated from each other and are distant axially. Also, the first and second main contacts 14, 18 are also separated from each other and are distant axially, so that no current can flow.

An insulating nozzle 22 is connected to the tulip-shaped arcing contact 12 and the associated first main contact 14. This nozzle 22 surrounds the two arcing contacts 12, 16 and further comprises a central through bore 24 in which the pin-shaped arcing contact 16 can move when the contacts 12-18 during the opening or closing of the circuit breaker 10.

The size of the bore 24 is complementary to the pin-shaped arcing contact 16, thereby partially sealing the through bore 24. In the switched-on end position, almost no insulating gas can thus flow through the insulating nozzle 22.

An electric arc 26 is generated during an opening of the circuit breaker 10, that is a transition from the closed position towards the opened position.

During the opening of the circuit breaker, the tulip shaped arcing contact and the associated main contact 14 move axially away from the pin-shaped arcing contact 16 and the associated main contact 18, to the left on the drawings.

This electric arc 26 forms between the tulip-shaped arcing contact 12 and the pin-shaped arcing contact 16, and heats the insulating gas. The heating of the insulating gas results in an expansion of the insulating gas located between the arcing contacts 12, 16, which is the gas located inside of the insulating nozzle 22.

Then, the pin-shaped arcing contact 16 moves further out of the insulating nozzle 22, so that a greater quantity of the insulating gas can flow through the insulating nozzle 22.

In FIG. 1, the contacts 12-18 are shown in the opened position, which is the switched-off end position. Accordingly, the tulip-shaped arcing contact 12 and the associated main contact 14 have been moved to the left while the pin-shaped arcing contact 16 and the associated main contact 18 have stayed immobile.

According to another embodiment (not shown), both the tulip-shaped arcing contact 12 and the pin-shaped arcing contact 16 move in the circuit breaker 10. During an opening step of the circuit breaker 10, the tulip-shaped arcing contact 12 and the associated main contact 14 move to the left, whereas the pin-shaped arcing contact 16 and the associated main contact 18 move to the right.

According to this embodiment, the nozzle 22 remains stationary with the casing 20.

As previously mentioned, the electric arc 26 is generated between the arcing contacts 12, 16 as a result of the separation of the arcing contacts 12-18.

As soon as the pin-shaped arcing contact 16 moves out of the insulating nozzle 22, insulating gas is blown onto this electric arc 26. This insulating gas is fed from a storage chamber 28 via a channel 30 to that region of the insulating nozzle 22, in which the electric arc 26 is present. In this region between the two arcing contacts 12, 16, the insulating gas is heated by the electric arc 26 and expands in the direction toward the tulip-shaped arcing contact 12, as well as in the direction toward the pin-shaped arcing contact 16, meaning to the left and to the right in FIG. 1.

Insulating gas is then separated into a first gas flow 32 flowing in the direction toward the pin-shaped arcing contact 16, and a second gas flow 34 flowing in the direction toward the tulip-shaped arcing contact 12.

The first gas flow 32 flows in a first intermediary gas chamber 36, which is formed by a carrier 38 that supports the pin-shaped arcing contact 16 and the associated second main contact 18. The first gas flow 32 exits the first intermediary gas chamber 36 through openings 40 in the carrier 38, and enters an annular main gas chamber 42.

The main gas chamber 42 extends radially between the carrier 38 and the casing 20 and is thus located radially outside of the first intermediary gas chamber 36. In this main gas chamber 42, the first gas flow 32 flows back in the direction toward the main contacts 14, 18, the first gas flow 32 thus flows parallel to the longitudinal main axis A and in the direction toward the two main contacts 14, 18.

The second gas flow 34 reaches a first gas chamber 44, which is delimited by a tube 46 that carries the tulip-shaped arcing contact 12 and the associated main contact 14. The second gas flow 34 flows through openings 48 in the tube 46 into a second intermediary gas chamber 50, which is delimited by the tube 46 and a support 52 that carries the first main contact 14 and the insulating nozzle 22 and is thus located radially outside of the first gas chamber 44.

Through first openings 54 in the support 52, a first portion 56 of the second gas flow 34 reaches the main gas chamber 42 that is also formed between the support 52 and the casing 20, and is thus located radially outside of the second intermediary gas chamber 50.

A second portion 60 of the second gas flow 34 exits towards an exhaust gas chamber 62. The second intermediary gas chamber 50 is axially bounded by a first radial wall 64 located axially on the contacts side and a second radial wall 66 located axially on the other side, distal from the contacts.

The second radial wall 66 comprises second openings 68 through which the second portion 60 of the second gas flow 34 exits the second intermediary gas chamber 50.

In the main gas chamber 42, the first portion 56 of the second gas flow 34 flows back in the direction of the main contacts 14, 18, approximately parallel to the longitudinal main axis A.

The first portion 56 of the second gas flow 34 then encounters and partially counter balances the first gas flow

32, preventing it partially to come into the region 58 located axially between the two main contacts 14, 18.

The pressure inside the main gas chamber 42 rises as a consequence, where the first portion 56 of the second gas flow 34 encounters the first gas flow 32, near the main contacts 14, 18.

The circuit breaker 10 is designed to have a limited increase of the pressure in the main gas chamber 42 by having a first portion 56 of the second gas flow 34 inferior in proportion than the second portion 60 of the second gas flow 34.

As a consequence, the pressure of the first gas flow 32 is reduced in the first intermediary gas chamber 36 and in the main gas chamber 42.

This result is obtained by a total section of the first openings 54 in the support 52 that is inferior to the total section of the second openings 68.

As a non-limiting example, the total section of the first openings 54 is approximately 5 cm2 and the total section of the second openings 68 is approximately 60 cm2.

It will be understood that a total section of openings is the sum of the sections of all the same openings.

The higher total section of the second openings 68 allows a better evacuation of the hot gases heated by the electric arc 26.

According to a first embodiment, the section of the second openings 68 is maximized, allowing a maximum of the hot gases to exit the circuit breaker 10.

Figure 2:
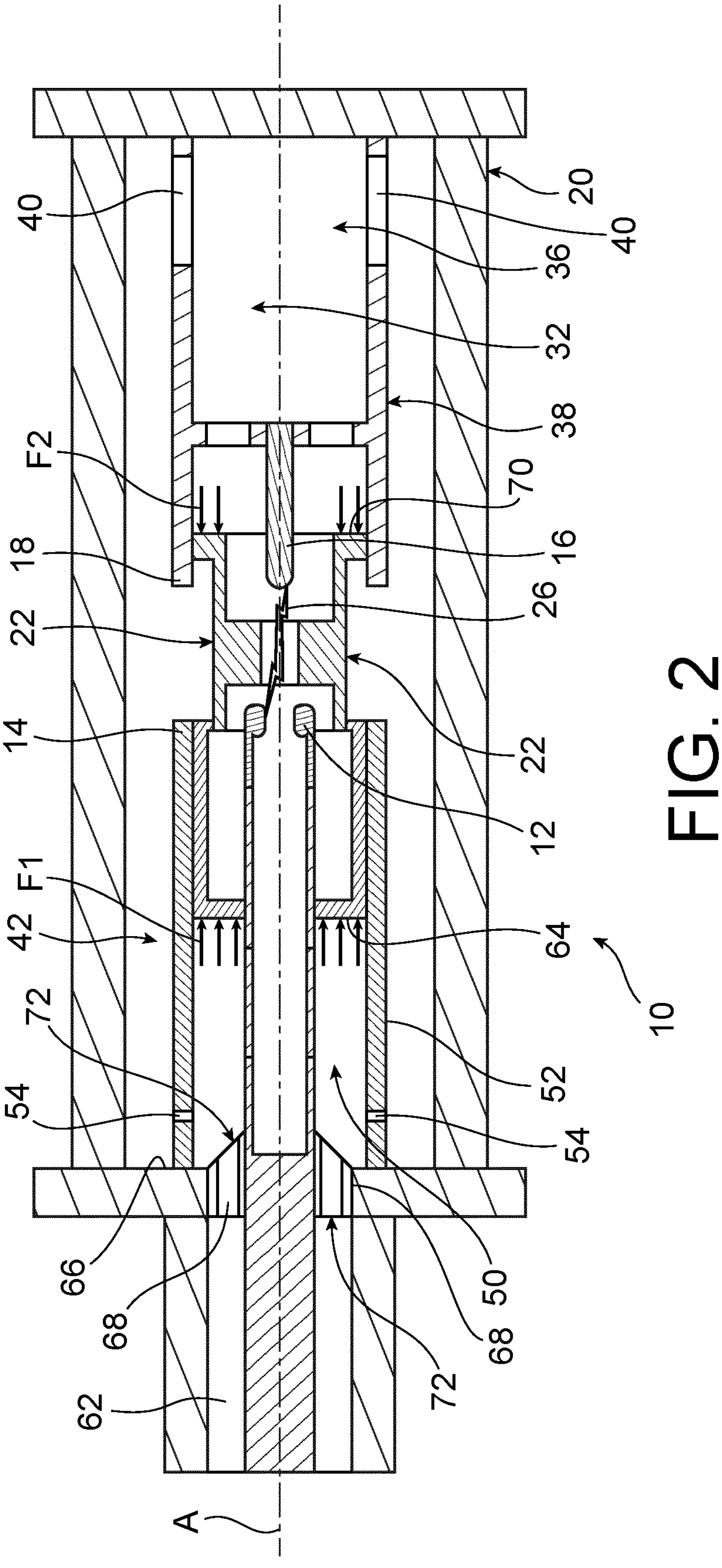
FIG. 2 is a diagram similar to FIG. 1, showing another embodiment of the invention.

According to a second embodiment, represented on FIG. 2, the section of the second openings 68 is calibrated so that the gas pressure inside the second intermediary gas chamber 50 is also calibrated.

The gas pressure inside the second intermediary gas chamber 50 results in a force exerted on the wall 64. This first resulting force is referenced F1 on FIG. 2.

On the other side of the nozzle 22, the first gas flow 32 exerts on a face 70 of the nozzle 22 a pressure resulting in a second force referenced F2 on FIG. 2.

According to an embodiment on FIG. 2, the wall 64 is movable jointly with the nozzle 22.

Then, the first resulting force F1 exerted on the radial wall 64 and the second resulting force F2 exerted on the nozzle 22 are opposing each other.

The calibration of the gas pressure in the second intermediary gas chamber 50 allows to balance the two opposing resulting forces F1, F2 on the nozzle 22, and more generally on the movable parts.

This ensures that the various gas pressures do not interfere with the speed of the movable parts, neither accelerating, nor decelerating them.

This force balance ensures a good mechanical behavior of the circuit breaker and reduces the risks of damaging parts.

Figure 5:
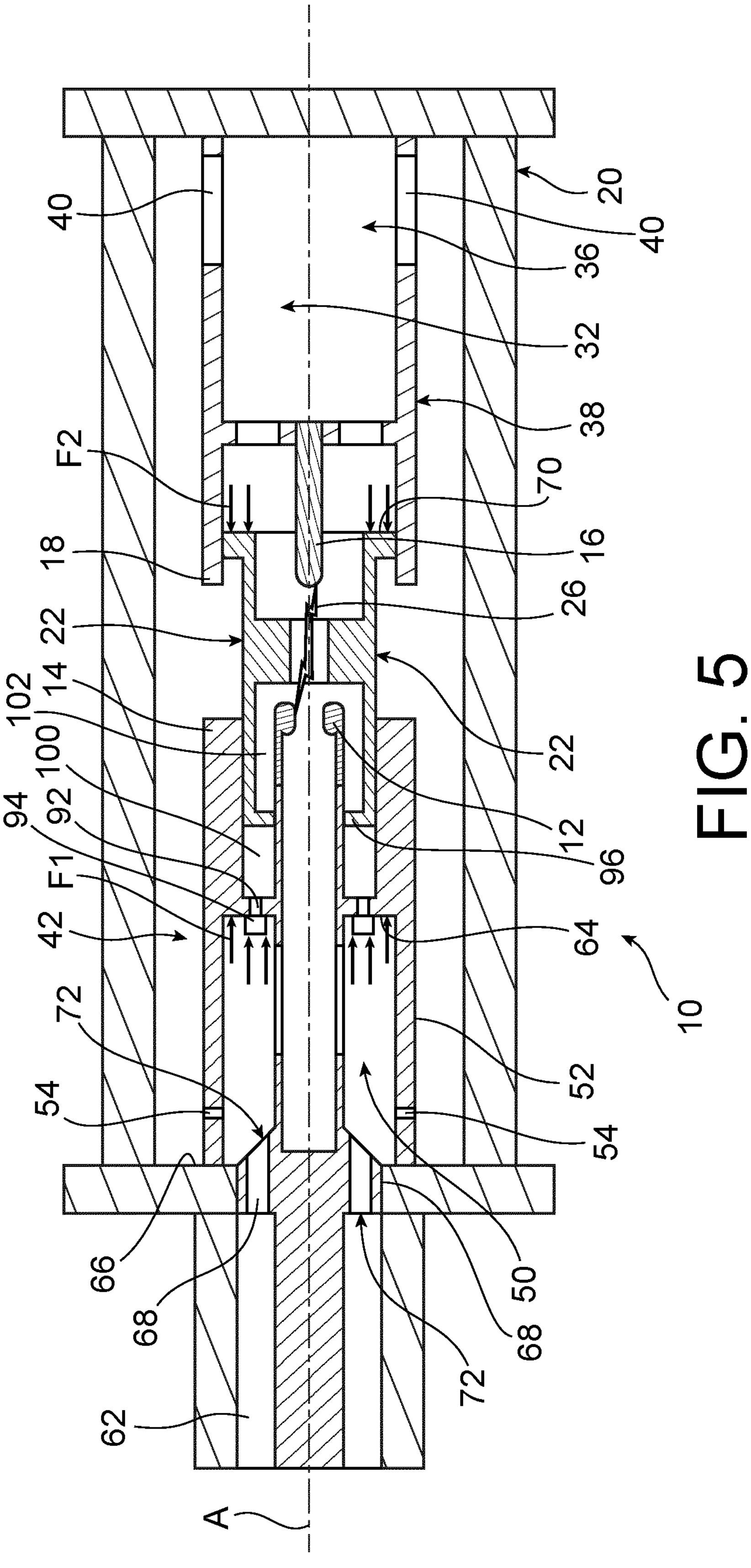
FIG. 5 is a diagram similar to FIG. 1, showing a variant embodiment of the invention implementing a damping effect

According to a variant embodiment represented on FIG. 5, the wall 64 is stationary with the support 52 and comprises apertures 92 closed off by discharge valves 94.

A movable wall 96 is movable jointly with the nozzle 22 in the support 52 and is located axially between the nozzle 22 and the wall 64. This movable wall 96 delimits together with the wall 64 a compression volume chamber 100. On the other axial side of the movable wall 96 is a thermal volume 102.

When the electric arc 26 is generated, the increase of the gas temperature in the thermal volume 102 and the displacement of the nozzle 22 together with the movable wall 96, increase the gas pressure in the compression chamber 100.

The calibration of the gas pressure in the second intermediary gas chamber 50 prevents the discharge valves 94 from opening until a certain gas pressure in the compression chamber 100 is attained, leading to a damping effect.

It will be understood that the damping effect as disclosed above can be combined with the other embodiments of the invention disclosed.

The calibration of the gas pressure in the second intermediary gas chamber 50 is obtained by calibrated conduits 72 located in the second openings 68. The inner section of these conduits is predetermined in consequence.

Figure 3:
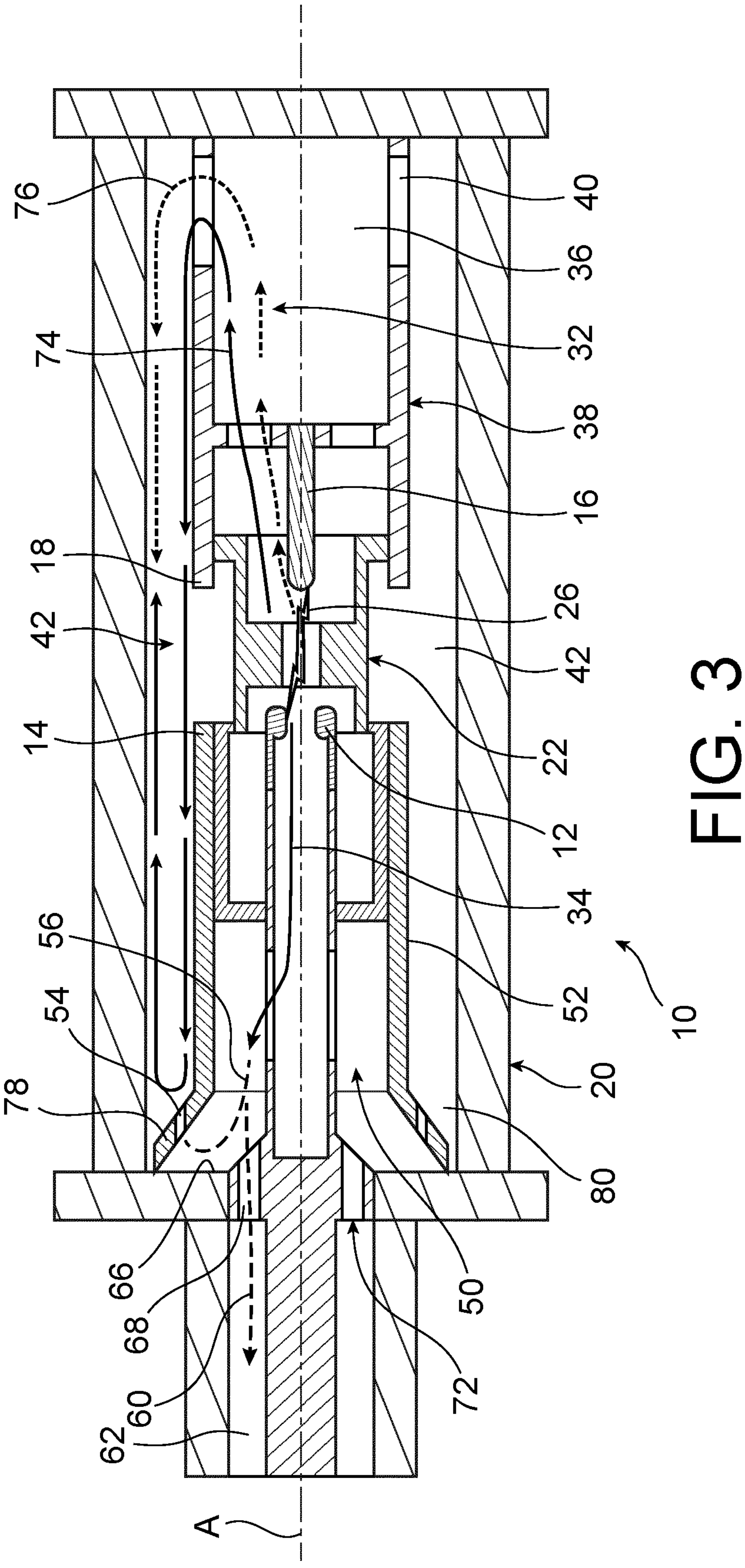
FIG. 3 is a diagram similar to FIG. 1, showing another embodiment of the invention.

According to a third embodiment represented on FIG. 3, the shape of the main gas chamber 42 defined by the support 52 and the casing 20 is designed to channel the pressure wave resulting of the flow of gas coming from the first and second intermediary gas chambers 36, 50.

This shape channels a first portion 74 of the first gas flow 32 to flow along the radially inner walls of the main chamber 42, that is to say along the carrier 38 and the support 52, to reach the tulip-shaped arcing contact 12 side of the main gas chamber 42. Then, the first portion 74 of the first gas flow 32 flows back axially along the casing 20 together with the first portion 56 of the second gas flow 34.

A second portion 76 of the first gas flow 32 flows along the casing 20 and encounters the combination of the first portion 74 of the first gas flow 32 and the first portion 56 of the second gas flow 34 at an axial location close to the main contacts 14, 18 and at a radial location close to the casing 20 and away radially from the main contacts 14, 18.

The first portion 74 of the first gas flow 32 is the pressure wave of the first gas flow 32, whereas the second portion 76 of the first gas flow 32 is the flow wave of the first gas flow 32 at high temperature.

Indeed, the first portion 74 of the first gas flow 32 is expanding more rapidly in the first intermediary gas chamber 36 and the main gas chamber 42 than the second portion 76 of the first gas flow 32.

According to a preferred embodiment, the support 52 comprises a conical portion 78 which allows a reduction of the section of the main chamber 42 when getting away from main contacts 14, 18 to the axial end of main chamber 42, that is to say the conical portion 78 is then opened away from the main contacts 14, 18.

This conical portion 78 directs the first portion 74 of the first gas flow 32 to flow back axially.

Preferably, the first openings 54 in the support 52 are formed in this conical portion 78, to encourage the first portion 74 of the first gas flow 32 to flow back axially.

According to a variant embodiment, the support 52 does not comprise such a conical portion 78. The redirection of the pressure wave resulting of the flow of gas coming from the first and second intermediary gas chambers 36, 50, can then be also implemented but the efficiency is lowered.

Due to the presence of the conical portion 78, the volume of the main gas chamber 42 is reduced so the pressure wave backflow of the first portion 74 of the first gas flow 32 will be earlier.

According to another variant embodiment, support 52 is of cylindrical shape, that is to say it does not comprise a conical portion and the reduction of the sections of the extremities of main chamber 42 are provided on the casing 20.

Figure 4:
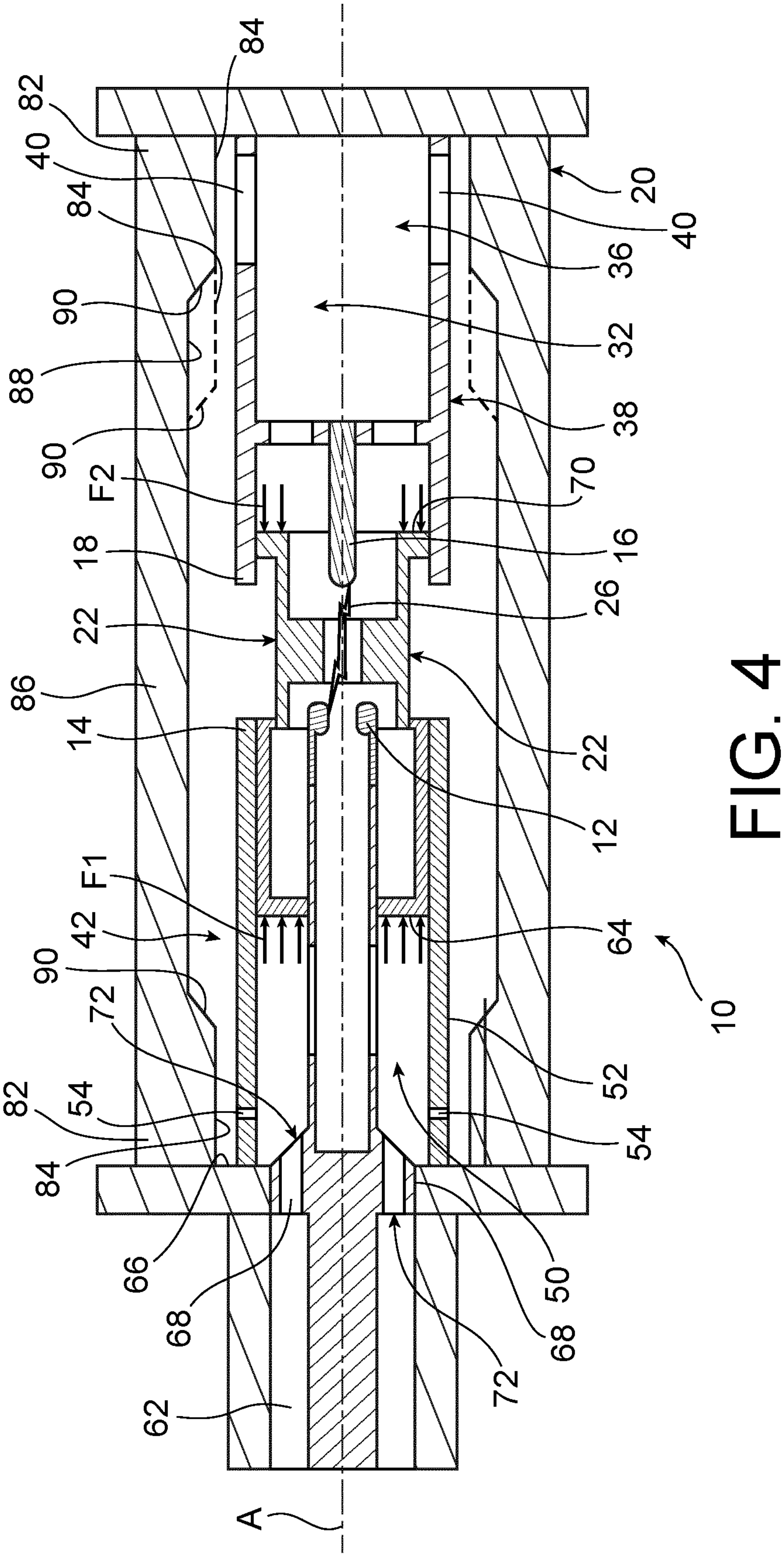
FIG. 4 is a diagram similar to FIG. 1, showing another embodiment of the invention.

As it can be seen on FIG. 4, each end portion 82 of the casing 20 comprises a cylindrical radially inner face 84 and the central portion 86 of the casing 20 comprises a cylindrical radially inner face 88.

The diameter of the inner face 84 of the end portions 82 is inferior to the diameter of the inner face 88 of the central portion 86 of the casing 20.

A conical face 90 connects each inner face 84 of an end portion 82 to the inner face 88 of the central portion 86.

The conical faces 90 on both end portions 82 act in the same manner than the conical portions 78 to direct the portions of the flows of gas.

In this second variant embodiment represented on FIG. 4, the end portions 82 of the casing 20 are symmetrical with respect to a median radial plane (not shown) of the circuit breaker 10. The axial lengths of the inner faces 84 of the end portions 82 are then equal and the conical faces 90 are symmetrical with respect to this median radial plane.

As a variation, the end portions are asymmetrical, that is to say the axial lengths of the inner faces 84 of the end portions 82 are different and the conical faces 90 are offset with respect to this median radial plane, as represented in dotted lines on FIG. 4.

According to this embodiment, where the casing 20 comprises the conical faces 90, the openings 54 open towards the inner faces 84 of the end portions 82.

The following values are given for an example of sizing of the circuit breaker 10.

The total section of the openings 40 in the carrier 38, through which first gas flow 32 exits the first intermediary gas chamber 36 is approximately 600 cm2.

The annular section of the main gas chamber 42, measured between the cylindrical inner face 88 of the casing 20 and the cylindrical outer face of the carrier 38 is approximately 200 cm2.

The total section of the first openings 54 in the support 52 is approximately 5 cm2.

The ratio between the total section of the openings 40 in the carrier 38 and the total section of the first openings 54 in the support 52, which is here written 40/54, is preferably 1%.

The ratio between the annular section of the main gas chamber 42 and the total section of the first openings 54 in the support 52, which is here written 42/54 is comprised between 0 and 10% and is preferably 5%.

The ratio between the total section of the first openings 54 in the support 52 and the total section of the second openings 68 in the support 52, which is here written 54/68 is comprised between 0 and 20% and is preferably 8%.

We claim:

1. A high-voltage circuit breaker filled with insulating gas having a main axis A, comprising:

two arcing contacts axially facing each other and radially surrounded by an insulating nozzle;

two main contacts axially facing each other and arranged radially outside of the insulating nozzle, each of the main contacts being assigned to one of the arcing contacts, wherein an insulating gas flowing from a storage chamber and heated by an electric arc in a region between the two arcing contacts is separated into a first gas flow and a second gas flow of opposite directions, wherein the first gas flow and second gas flow are conducted outside of the insulating nozzle from opposite directions at least partially toward a main gas chamber surrounding the main contacts, wherein the first gas flow flows toward the main gas chamber through a first intermediary gas chamber and the second gas flow flows toward the main gas chamber through a second intermediary gas chamber, wherein the second gas flow flowing in the second intermediary gas chamber is separated in a first portion directed to the main gas chamber and a second portion directed to an exhaust gas chamber, wherein the first portion of the second gas flow is smaller than the second portion of the second gas flow, wherein the second intermediary gas chamber is in fluidic communication with the main gas chamber via at least one first opening and is in fluidic communication with the exhaust gas chamber via at least one second opening, characterized in that an overall area of the at least one first opening is less than an overall area of the at least one second opening.

2. The high-voltage circuit breaker according to claim 1, wherein the first gas flow exits the first intermediary gas chamber through openings, and wherein a ratio between a total area of the openings and a total area of the first openings is comprised between 0% and 10% and a ratio between the total area of the first openings and a total area of the second opening is comprised between 0% and 20%.

3. The high-voltage circuit breaker according to claim 1, wherein the second intermediary gas chamber is axially bounded by a radial wall located axially on a contacts side, and wherein the second gas flow presses axially on said radial wall towards the arcing contacts.

4. The high-voltage circuit breaker according to claim 3, wherein a surface of the radial wall is designed so that a force resulting from a pressure of the second gas flow on the radial wall balances a force resulting from a pressure of the first gas flow on a movable part of the circuit breaker.

5. The high-voltage circuit breaker according to claim 4, wherein the radial wall is movable in the circuit breaker together with the nozzle and the nozzle comprises a radial face on which the first gas flow presses axially towards the arcing contacts, wherein the surface of the radial wall is designed so that said force resulting from the pressure of the second gas flow on the radial wall balances said force resulting from the pressure of the first gas flow on the radial face of the nozzle.

6. The high-voltage circuit breaker according to claim 4, wherein the radial wall is stationary in the circuit breaker and comprises apertures closed off by discharge valves and wherein that said force resulting from the pressure of the second gas flow on the radial wall prevents the discharge valves from opening until a certain gas pressure is attained.

7. The high-voltage circuit breaker according to claim 1, further comprising calibrated conduits located between the second intermediary gas chamber and the exhaust gas chamber.

8. The high-voltage circuit breaker according to claim 1, wherein the main gas chamber is of annular shape and surrounds other components of the circuit breaker, and wherein an axial end of the main gas chamber, located on the second intermediary gas chamber side, is designed to provoke the first gas flow to flow back axially towards the first intermediary chamber.

9. The high-voltage circuit breaker according to claim 8, wherein an annular wall separating the main gas chamber and the second intermediary gas chamber comprises a conical portion which allows a reduction of an area of the main chamber when getting away from main contacts.

10. The high-voltage circuit breaker according to claim 9, wherein first openings are formed in the conical portion.

11. The high-voltage circuit breaker according to claim 8, wherein at least one end portion of an outer wall surrounding the main gas chamber comprises an inner face of reduced diameter with respect to a central portion of the outer wall.

* * * * *